United States Patent [19]
Berkeley et al.

[11] Patent Number: 5,816,491
[45] Date of Patent: Oct. 6, 1998

[54] METHOD AND APPARATUS FOR CONSERVING PEAK LOAD FUEL CONSUMPTION AND FOR MEASURING AND RECORDING FUEL CONSUMPTION

[75] Inventors: Arnold D. Berkeley, 9748 Avanel Farm Dr., Potomac, Md. 20854; Donald E. Jefferson, Silver Spring, Md.

[73] Assignee: Arnold D. Berkeley, Bethesda, Md.

[21] Appl. No.: 616,454

[22] Filed: Mar. 15, 1996

[51] Int. Cl.⁶ .................................. F23N 5/20; H02J 1/00
[52] U.S. Cl. .......................... 236/46 R; 165/267; 307/39
[58] Field of Search ........................... 62/231; 236/46 R; 165/268, 269, 267; 219/492; 307/39

[56] References Cited

U.S. PATENT DOCUMENTS

| | | | |
|---|---|---|---|
| 4,293,915 | 10/1981 | Carpenter et al. | 307/39 X |
| 4,453,590 | 6/1984 | Holliday et al. | 236/46 R X |
| 4,485,966 | 12/1984 | Cartmell et al. | 236/46 R |

Primary Examiner—William E. Wayner
Attorney, Agent, or Firm—Richard H. Stern

[57] ABSTRACT

A method and control apparatus are described for limiting peak-load contribution by HVAC systems and other systems, and for measuring the effect of energy-conservation expedients. The control apparatus reduces the percentage of on-time and thus fuel and power consumption and demand for utility capacity to a predetermined extent during peak-load periods, by inhibiting fuel-on signals from the thermostat of each HVAC system to the furnace, fuel-pump, or air conditioner of the HVAC system, or other system, so that the total on-time during a load-measuring interval is reduced to a predetermined amount. During non-peak periods, the control apparatus is inactive and the thermostat controls the HVAC system. The measurement aspect of the invention measures and records on and off state time intervals for the HVAC system, and temperatures associated with such intervals. The invention can be used to retrofit an already installed thermostat, incorporated into a new thermostat installation, or incorporated into a thermostat as it is manufactured.

42 Claims, 6 Drawing Sheets

METHOD AND APPARATUS FOR CONSERVING PEAK LOAD FUEL CONSUMPTION AND FOR MEASURING AND RECORDING FUEL CONSUMPTION

BACKGROUND OF THE INVENTION

1. Field of Invention

This invention concerns a system for controlling building heating, ventilation, and air conditioning (HVAC) systems, and non-HVAC fuel-consuming systems, in a manner that lessens the need for utility peak-load capacity and for consumption of fuel by electric utilities and by customers of gas utilities. The invention also concerns a method for operating HVAC systems under the control of such a control system to lessen utility peak-load consumption of fuel. The invention also concerns a method and apparatus for measuring and recording the fuel consumption of HVAC systems, when operating under control of the foregoing control system and method or other control systems and methods, so as to determine relative cost and efficiency of different energy-using or energy-saving expedients. (As used herein, the term "fuel" means electrical power and gas, oil, coal, and other fossil fuels.)

2. Prior Art

A particular method (hereinafter referred to at times as the "max-on method") of limiting peak fuel-consumption load for a utility, by suitably designing thermostats for buildings served by the utility, is described in the inventors' U.S. Pat. No. 5,244,146 (Sep. 14, 1993), to which reference should be made. That patent also describes thermal parameters of buildings, relating to heat leakage and other heat flux, with a principal focus on heating systems. Other useful background information on thermal parameters of buildings and design-day conditions is found in publications of the American Society of Heating, Refrigeration, and Air-Conditioning Engineers (ASHRAE), such as the following: ASHRAE Fundamentals Handbook (1981, 1985, 1989 eds.); ASHRAE HVAC Handbook (1987 ed.); and ASHRAE Applications Handbook (1982 ed.).

The ASHRAE publications teach methods for predicting the fuel consumption of the HVAC system in a given house, under given external temperatures and given HVAC system thermostat set points. Data also exist for given localities that predict worst case external temperatures-for example, lowest anticipated temperature during a year, or lowest anticipated temperature over a 30-year period. Similarly, data exist for hottest temperature likely to occur in 30 years, etc. Such weather data, when used in conjunction with the ASHRAE formulas for fuel consumption, permit a statistical prediction to be made for the maximum anticipated contribution to peak load fuel consumption by a given house's HVAC system, for a 1-year, 30-year, etc. worst case situation.

peak load is important to gas and electric utilities, because it significantly affects their capital expenditures and demand charges. Utilities often must pay their fuel suppliers on a basis, in whole or in part, of "demand charges " or "take or pay charges." That is, they must pay suppliers, at least to some extent, on the basis of the utility's peak load rather than merely on the basis of actual fuel supplied to the utility. Peak load is also important to electric utilities in connection with anti-pollution requirements on sulphur dioxide emissions and possible future limits on carbon dioxide emissions.

It is desirable to a utility to limit its peak load, but utilities are also obligated to supply power or fuel to consumers in accordance with their needs, including peak needs. Electric utilities typically chart their power or fuel usage for 48 half-hour periods, on the hour and on the half hour, during a given 24-hour day. If data projections indicate that a given period, say 4:30 pm to 5:00 pm on the first Thursday of July, will have a power or fuel consumption approaching 100% of the utility's total capacity, the utility must contract to purchase additional power or fuel, or must build additional capacity to meet the anticipated peak load.

Both pipelines and gas distributor utilities must meet a peak hourly demand for gas to be sent to their customers. They purchase gas on the basis of a maximum daily quantity, and also contract to use more than that daily quantity, divided by 24 hours, up to a stated hourly maximum. They pay annual or seasonal demand charges based on these quantities. Therefore, they also want to limit their peak-load consumption or sendout.

Each electrical utility uses its own procedure to chart peak usage and to plan its reaction to excessive loads, such as by shutting off some customers, reducing voltage ("brown-out"), and in some instances change of phase angle. For planning purposes, both gas and electric utilities employ computer simulations of forecast peak loads and the given utility's available capacity to meet these loads. These models identify the timing and extent of anticipated shortages of capacity. The information developed enables the utility company to determine the kind, size, and timing of capacity additions. Each utility makes its own determination how to react to possible excessive loads. Such determinations are strongly affected by the backup, emergency, or gas storage arrangements at the disposal of the given utility.

Some utilities presently control peak load by contracting with some customers to give them a lower rate or a discount in return for the utility's itself having the option to turn off the customers' loads when necessary to limit peak load. Utilities accomplish this by installing radio-controlled (or telephone-controlled) relays at customer sites, and by turning off power at peak load times by sending an appropriate radio (or telephone) signal to such sites (see, e.g., Hammer U.S. Pat. No. 4,345,162, Aug. 17, 1982). An installer inserts the relay into each HVAC or other unit to be controlled; ordinarily, installation by homeowners on a do-it-yourself basis is infeasible. This method is costly in terms of equipment costs and labor costs for installation. Also, this method permits only a "go/no-go" operation, in which all of the customer units at sites responsive to the controlling radio signal are either completely unregulated by the utility or else are shut off completely, causing a step-function effect on load. (This method of control of peak load is referred to at times hereinafter as the "go/no-go" method or system.)

Such methods of control of peak load require that the control device be operated by the utility from a location remote from the site at which an HVAC system is operated subject to the control method. Such methods do not provide a control means that operates autonomously at the building site at which the control device is installed. These methods operate only where there is an appropriate co-action between the control device and a signal coming from the utility company, that it provides to effectuate peak-load reduction.

For purposes of activating radio-operated systems for cutting off preselected loads during peak-load operation, a utility will compare its current and impending load with its capacity. The purpose, in the case of an electric utility, is to avoid need for "brown-out" and the danger of a "black-out." An electric utility may also impose such a cut-off to avoid using peaking units that burn the most expensive fuels. Gas utilities cannot reduce distribution line pressures, however, so that they must simply curtail interruptible industrial and commercial customers. If such measures are insufficient, the utility may curtail selected regions to avoid a system-wide problem.

Both gas and electric utilities are obligated to provide sufficient capacity to serve peak load incurred in a normal year of weather conditions, and in the extreme weather conditions that may occur only once in many years (a so-called design year). These design-year peak loads set the utility's minimum capacity requirements. Some utilities seek to decrease both total load and peak load. Some electric utilities also seek to modify the shape of their peak loads (viewed in terms of a graph of load vs. time), because narrow peaks may be dealt with by use of relatively cheap gas turbines rather than with more expensive nuclear or coal facilities. Residential and commercial loads are highly temperature-sensitive, which leads to large differences in average loads and peak loads.

Because of the conflicting pressures on utilities of their need to minimize peak loads and their legal obligations to provide customers with sufficient capacity to meet extreme demands, utilities have long sought means (1) to reduce maximum peak demand in a way that will decrease the discrepancy between peak and average consumption and demand or take-or-pay charges, and (2) to measure and predict reliably what effect different improvements in customer side energy efficiency (efficiency promoting expedients) will in fact have on the utility's average peak load and load curve (particularly its shape). It is believed that at present such means are not available to utilities on an inexpensive and efficient basis.

OBJECTS AND SUMMARY OF THE INVENTION

It is an object of this invention to provide a means by which a utility can control peak load fuel consumption in a set of buildings served by the utility, by equipping the HVAC systems of the buildings with a means of decreasing the HVAC systems' fuel consumption during peak load periods. It is a further object to accomplish the foregoing inexpensively and without incurring significant equipment and labor costs. It is still a further object to provide means for measuring the effect of fuel consumption expedients on average and peak load, and to do so in a manner that will provide utilities with such information on an efficient and inexpensive basis.

The invention permits the utility using it to reduce total load as well as peak load. Some utilities now seek both these goals. Even though the utility must have enough capacity to meet higher design peaks, it and its customers benefit greatly from reducing load during all other peaks, especially normal-year peaks. This invention reduces non-design peak loads and thus permits the utility to substitute cheaper peaking plant equipment (e.g., gas turbines) for much more expensive base-load plant equipment (e.g., coal or nuclear plants).

A further object of the invention is to decrease fuel consumption by a group of HVAC systems of buildings without causing abrupt, step-function changes in fuel consumption, and without requiring all HVAC systems affected by the utility's peak-load control system to be off at all times during the regulated interval, as occurs with the go/no-go method previously described. (By simultaneously restoring service to all or a group of previously cut off customers, a utility will experience a higher load than it would have experienced as a peak load without such cut-offs, as well as an abrupt, step-function increase in load when the regulated interval ends. This problem may be dealt with by dividing customers into several groups and successively restoring service to each group.)

Another object of the invention is to enable a utility to choose between a uniform peak-load reduction for all customer sites or a site-specific peak-load reduction that will avoid customer discomfort and/or impaired health. The invention can be used in either manner by using the same equipment.

Another object of the invention is to enable utility customers to be alerted when their non-HVAC fuel consumption, which may be deferred or reduced if use of the equipment at that particular time is not critical, occurs during a peak-load period; deferral or reduction of such usages can reduce these customers' annual demand charges, which are based on a single peak maximum usage. Non-HVAC usage may also be cut off automatically.

The load-control aspect of the invention provides a control unit that is inserted in the low-voltage signal lines of each individual building's thermostat, which can be accomplished by a simple retrofit operation that does not require access to 115 v or 230 v power lines or the services of a trained installer or licensed electrician; the control unit can also be incorporated into any newly manufactured thermostat. The unit prevents the building's thermostat from turning the HVAC system on, thereby consuming fuel, for more than a predetermined maximum time during each peak-load interval. This is accomplished by preventing transmittal of fuel-on signals (which causes HVAC-system fuel-on states to occur) for longer than a predetermined period, and preventing stoppage of fuel-off states (and recommencement of fuel-on states) before a predetermined period has elapsed. Once the control units are installed into the buildings, each building's HVAC system operates independently in accordance with the settings of the control unit of that building. Thus the utility realizes a predetermined peak-load saving averaged over all of the buildings equipped with the control unit of the invention.

The invention permits a utility to specify at least a primary peak-load limit and also one or more secondary peak-load limits. The primary heating or cooling load limit can be based on normal yearly peak load, i.e., worst weather conditions anticipated over a year. A secondary heating or cooling load limit can be based on design-year worst weather conditions, such as the hottest and coldest weather conditions anticipated over 30 years. Primary and secondary limits can also be based on anticipated non-weather determined peak loads, also. The utility may also specify load limits which will operate during maximum peak periods.

The load-control unit of the invention must generate a signal to indicate that the HVAC system is being curtailed from consuming fuel, because of having reached the utility-defined peak-load limit. This signal can be made available to control any other energy-consuming unit at the site, if that is desired, even though the other unit is not directly controlled by the HVAC system's thermostat. This can be done by conventional, well known techniques using wireless or wire signals from the thermostat. If the utility wishes, it can provide a separate limit control unit that cuts off other energy consuming units when, or at an earlier or later time than, the HVAC unit is cut off.

The measurement aspect of the invention uses an interface device, which in one format the inventors have designated as the LOAD PROFILE APPLIQUE™ or LP APPLIQUE™, which can be placed between a conventional or special purpose thermostat and its low-voltage control lines. The LP APPLIQUE is designed to fit onto the base of a 3M™ round thermostat and permits the spherical segment portion of that device to be fitted onto the LP APPLIQUE, so that the LP APPLIQUE is located intermediate the outer and base portions of the thermostat. When this is done, the interface device records times and on or off signals from the thermostat, and inside ambient temperatures, so as to provide a record of fuel consumption when the HVAC system is operated under the control of that thermostat. The utility subsequently processes the information so recorded, to determine the effectiveness of the energy consumption control devices at the site.

DETAILED DESCRIPTION OF INVENTION

Background

Parameters

Figure 1:
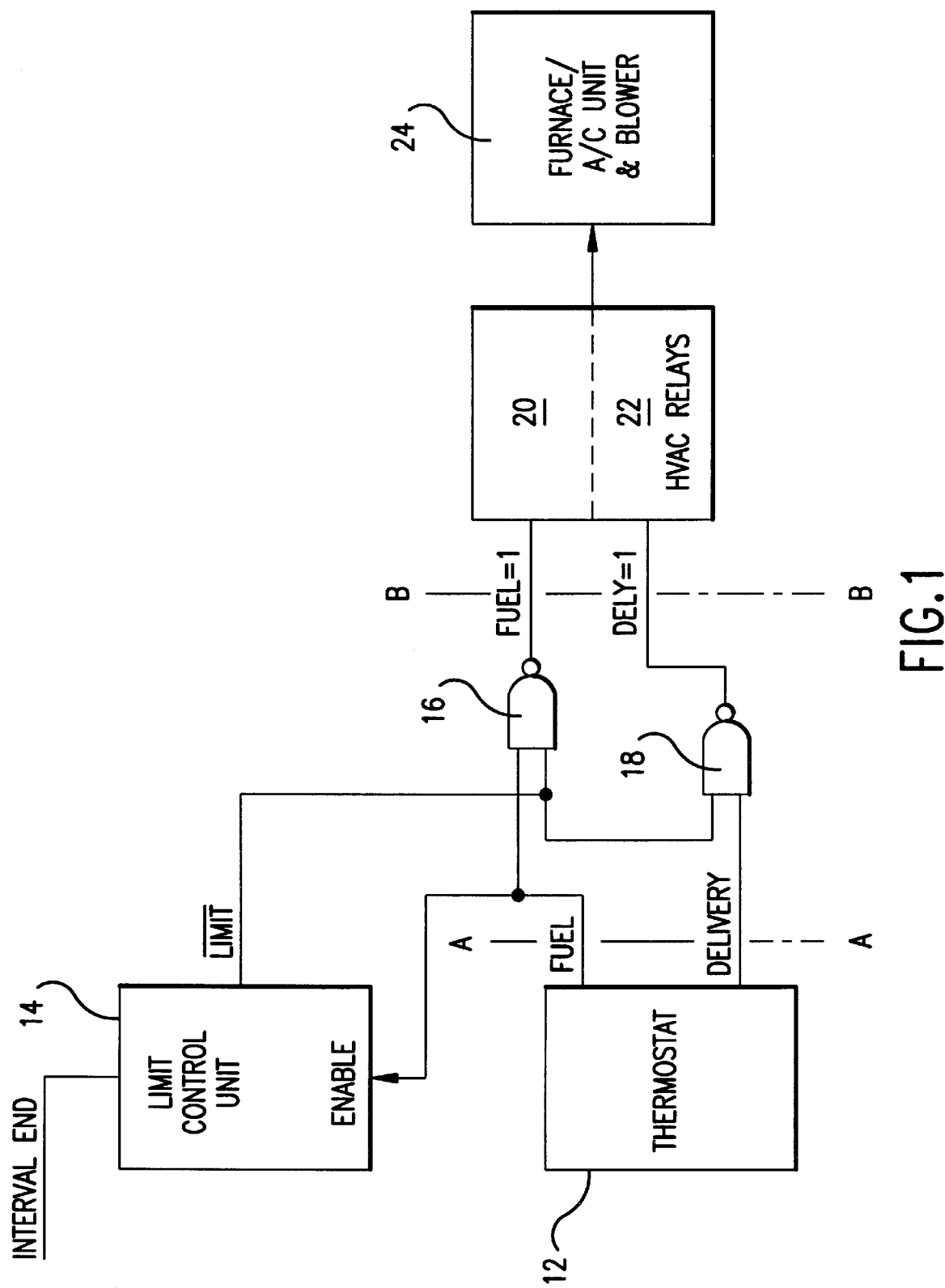
FIG. 1 is a block diagram of the control system of the invention.

As explained in the inventors' previously cited U.S. Pat. No. 5,244,146, a heated space of a home or other building may be modeled in terms of heat flux parameters. For the present purpose, the following heat flux parameters may be considered:

$P_L$ is a leakage parameter representing the heat flux (leakage) between the heated or cooled space and its external environment, dimensioned in °F./sec or a comparable measure, at a given time. This variable parameter indicates the rate at which the space in the building leaks heat to the external environment in the system's heating mode, or absorbs heat from the external environment in the system's cooling mode, in a unit time. The variability of this parameter primarily depends (ignoring occupant and appliance activity in the space) on (a) the difference between the temperature inside the space and the temperature of the external environment, (b) differences in solar radiation flux (ordinarily significant only in cooling mode), and (c) the ratio between $P_d$ and $P_L$.

$P_L$ can be directly measured using either manual or automatic means. A method and apparatus for doing so is described in the above-referenced '146 patent. A manual means of measuring $P_L$ in heating mode is to observe room temperature at the time that the fan (blower) turns off, and start a stopwatch running. A second observation of room temperature is made after a time interval elapses. $P_L$ is the ratio between temperature decrease and elapsed time.

$P_{LD}$ is the space peak-load design leakage parameter, representing the heat flux between a heated or cooled space in a building and the external environment surrounding the building, dimensioned in °F./sec or a comparable measure, as designed for worst-case conditions. It indicates the rate at which the space in the building leaks heat to the external environment in heating mode, or absorbs heat from the external environment in cooling mode, in a unit time under conditions based on selected design peak load parameters, for example, those of the well-known conventional ASHRAE method (explained in the ASHRAE references cited in the second paragraph of this specification), to produce the maximum peak load on the utility supplying energy (fuel) to the given building. For example, the furnace of an HVAC system might be designed to have sufficient heating capacity, for the particular building in which the furnace is located, to maintain a space temperature of 60° F. under the worst (coldest) weather conditions likely to occur in 30 years (or any other appropriate time interval) at that site. (If the thermostat set point is considered to be 68° F. instead of 60° F., the value of $P_{LD}$ calculated, for example, by the ASHRAE methodology would be higher and therefore the required furnace capacity to maintain space temperature at that set point would be higher.)

$P_d$ is a delivery parameter representing the heat flux between the HVAC system and the heated space or cooled space, dimensioned in °F./sec or a comparable measure. It indicates the rate at which the system can deliver heating or cooling in a unit time, during which leakage heat flux occurs at rate $P_L$. ($P_d$ is thus a net heat flux parameter.)

$P_d$ can be directly measured using either manual or automatic means. A method and apparatus for doing so is described in the above-referenced '146 patent. A manual means of measuring $P_d$ in heating mode is to observe room temperature at the time that the fan (blower) turns on, and start a stopwatch running. A second observation of room temperature is made after a time interval elapses. $P_d$ is the ratio between temperature increase and elapsed time.

$T_{start}$ refers to the temperature (e.g., in °F.) of the heated or cooled space at the start of an on portion of a cycle, for example, at the time when an HVAC system's furnace begins to deliver heat to the space. $T_{end}$ refers to the temperature of the space at the end of such a portion of a cycle, for example, when an HVAC system stops delivering heat to the space. (Under these conditions, $T_{start}$ is a minimum temperature and $T_{end}$ is a maximum temperature for the heated space.) The absolute value of their difference, $|T_{start}-T_{end}|$, in a state of equilibrium is the thermostat deadband, D.

The terms $t_{on}$ and $t_{off}$ refer respectively to the length of time (in seconds, minutes, or other time units) that the furnace or air conditioning unit is on or off in a given cycle; $t_{total}=t_{on}+t_{off}$, i.e., an entire on-off cycle. In addition, corresponding terms with primes may be defined that represent the sums of each of the foregoing terms during any given interval, such as a 30 minute peak-load measuring interval. Thus, $t'_{total}=t'_{on}+t'_{off}$, where $t'_{total}$ is the entire interval, e.g., 30 minutes; $t'_{on}$ is the sum of all on-times during the interval; and $t'_{off}$ is the sum of all off-times during the interval.

There may be, but there is not necessarily, a plurality of on or off time intervals during the interval $t'_{total}$. It is possible that only one on-time interval and one off-time interval occur during a given peak-load measuring interval. It is also possible, under some operating conditions of an HVAC system, that an entire peak-load measuring interval coincides with, or falls within, a single continuous interval such as a very long off-time interval. (For example, in temperate weather in spring or fall a given system might have a particular off-time interval beginning at 2:50 pm and ending at 3:40 pm, while the peak-load measuring interval at that time ran from 3:00 to 3:30 pm.)

Another parameter that may be of interest is $F_d$, a fuel consumption parameter. For a furnace with a fixed gas delivery rate, $F_d$ is a positive constant number when the furnace burns fuel and is zero when the furnace is off. Not all of $F_d$ is attributable to providing $P_d$. Some energy is always lost up the flue or to other system losses. As will be appreciated from the preceding equations, during an interval $t'_{total}$, e.g., 30 minutes, the fuel consumption will be the product of $F_d$ and $t'_{on}$. This product may be termed F'. It is the quantity that a utility desires to lessen at any given site during maximum peak load or other times.

Unregulated Operation

Consider a period of high load during which a given HVAC system is cycling on and off as it heats (or cools) a given space. During the energy delivery or fuel-on cycle (during which the HVAC system consumes fuel and heats or cools the space):

$$t_{on} P_d = |T_{start} - T_{end}| = D. \qquad (\text{Eq. 1})$$

In words, the product of the time the furnace (or cooling) system is on and the rate of heat delivery (or removal) is equal to the difference between starting and ending temperatures, which equals the deadband.

During the non-energy delivery or fuel-off cycle (during which the HVAC system does not consume fuel, and leakage to or from the external environment occurs):

$$t_{off} P_L = |T_{start} - T_{end}| = D. \qquad (\text{Eq. 2})$$

That is, a like process occurs during the off part of the cycle, when heat flux to the environment is reversed in sign.

In a state of equilibrium:

$$t_{on} P_d = t_{off} P_L = D \qquad (\text{Eq. 3})$$

and the on-time ratio, defined as the ratio of on-time to the entire cycle of on-time plus off-time (expressed at times hereinafter as a percentage), is as follows:

$$R_{OT} = \frac{t_{on}}{t_{total}} = \frac{t_{on}}{t_{on} + t_{off}} = \frac{1}{1 + \frac{P_d}{P_L}} \qquad (\text{Eq. 4})$$

The same equation is approximately correct when primes are added to the time variables to refer to totals during a given 30-minute (or other) peak-load measuring interval. In that form, the foregoing equation becomes:

$$R_{OT} = \frac{t'_{on}}{t'_{total}} = \frac{t'_{on}}{t'_{on} + t'_{off}} = \frac{1}{1 + \frac{P_d}{P_L}} \qquad (\text{Eq. 5})$$

Thus, it is possible to ascertain from the above equations and system parameters what will be the on-time ratio or loading effect of a given system on the utility serving it on the basis of peak-load parameters of the selected design or normal year or other space heating and cooling loads. For example, if a given building has a heat pump or air conditioning system using 10 KW, and the values of its parameters $P_d$ and $P_L$ are 0.1° F./min and 0.2° F./min respectively, during the air conditioning season, at a given set point and external temperature, then the on-time ratio is 1/(1+0.5)=1/1.5=66.67%. The building's HVAC system loads the utility system at 6.67 KW (or BTU equivalent). In the foregoing example, there is no assurance that $P_L = P_{LD}$. Therefore it would be possible for $P_L$ to increase with an increasing environmental load (e.g., increasing external environment temperature, in air conditioning mode). In that case, $P_d$ would decrease and $t_{on}$ would increase so that the percent on-time would approach 100%. In the event that $P_L$ decreased, the utility would suffer no adverse effect on its peak load.

The conventional ASHRAE method previously referenced (see Background/parameters, at beginning of Detailed Description of Invention) provides a design methodology for anticipated worst-case weather conditions (for example, coldest or hottest weather likely to occur in 30 years). The temperature-sensitive load at a given site under peak design conditions (e.g., worst case in 30 years) would involve the following restatement of the immediately preceding equation for $R_{OT}$:

$$R_{OT-worstcase} = \frac{1}{1 + \frac{P_d}{P_{LD}}} \qquad (\text{Eq. 6})$$

This value indicates the expectable on-time ratio under worst-case unregulated loading conditions and a given set point. It would be a higher ratio than that obtaining under ordinary weather conditions.

Peak Load Regulation

The peak load control aspect of the invention is now illustrated on the basis of the foregoing assumed building. Assume, further, that the utility has determined that it does not wish to use a uniform peak-load reduction for all sites, and that it requires that the peak-load contribution of the given building must be limited from 6.67 KW to 4.5 KW, that is, to 4.5/6.67=67% of the unregulated contribution to peak load. This would call for a reduction of the percent on-time for that building from 66.7% to 45%. To implement this peak-load reduction, the utility needs to specify any two of the three parameters in the equation $t'_{total} = t'_{on} + t'_{off}$.

One method by which a utility can implement the foregoing type of peak-load reduction is to run regulated HVAC systems full on for an interval equal to $t'_{on}$, and then turn them off for an interval equal to $t'_{off}$. This is essentially how a go/no-go radio-control system designated by various names, such as the "Reddi Kilowatt" system, operates, e.g., all systems permitted to be on for the same 13 minutes and then required to be off for the same next 17 minutes. (The Reddi Kilowatt method allows, but does not require, all HVAC systems in a given group to be on for the first interval, e.g., 13 minutes. Thus, if a particular HVAC system in the group has a short on-off cycle, it may go on and off several times during the foregoing 13-minute interval. The Reddi Kilowatt method requires all systems in the group to be off at all times during the second interval, e.g., the next 17 minutes. Therefore, the hypothetical HVAC system with a short on-off cycle would be off for a total of more than 17 minutes during the 30-minute peak-load measuring interval of this example. That might cause the system to drift appreciably away from set point during the 17 "off" minutes.) The inventors consider it preferable, however, to operate with a set of $t_{on}$ and $t_{off}$ intervals, respectively, that are not necessarily simultaneous with, or as long as, the cumulative on and off times, $t'_{on}$ and $t'_{off}$, and that are distributed across the peak-load measuring interval.

It should be understood that the given building referred to above is only one of many similarly regulated buildings, with randomly distributed operating cycles. The reduction in total peak load for the utility is the result of the averaged operation of the many similarly regulated buildings.

The utility can accomplish the above-described reduction by appropriately determining the value of the ratio of $P_d/P_L$ that results in the desired on-time ratio. The value of $t'_{on}$ can then be determined, for a given peak load measuring interval, for example, 30 minutes, as follows:

$$t'_{on} = \frac{30}{1 + \frac{P_d}{P_L}} \quad \text{(Eq. 7)}$$

Then, the previously discussed formulas can be used to determine the values of $t'_{off}$, $P_d$, and $P_L$.

Adjusting to a percent on-time of 45% causes the limit time-on device to be activated when the value of $P_L$ reaches 0.1212 instead of 0.2 as was the case in the previous example. $P_d$ increases to 0.1481, providing a ratio of $P_d/P_L = 1.213$. If the same deadband of 2° F. is maintained, then $t'_{on} = 13.5$ min and $t'_{off} = 6.5$ min.

Figure 5:
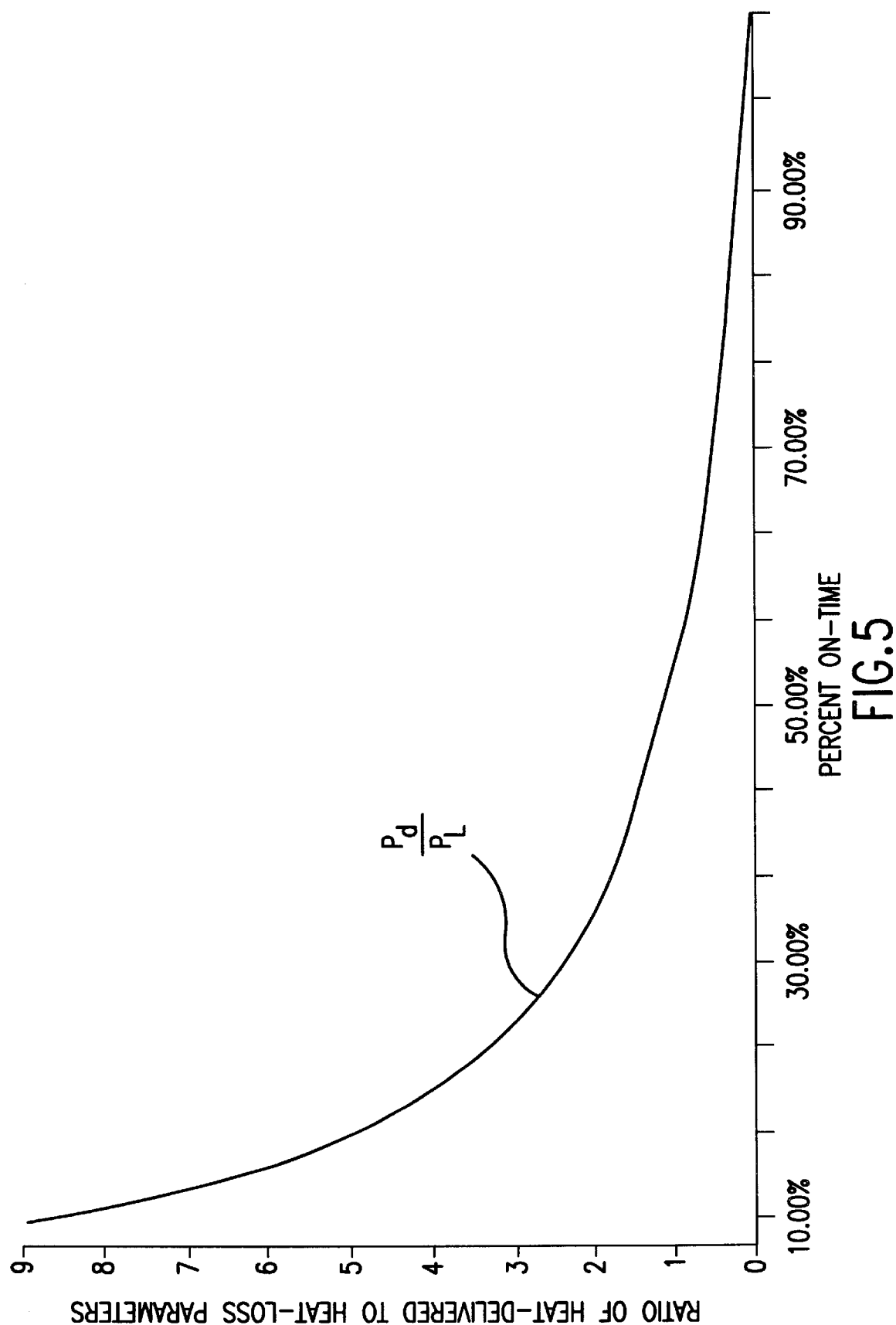
FIG. 5 is a curve showing percentage of on-time as a function of the ratio of delivery parameter to leakage parameter.

FIG. 5 provides a graphical representation of the percent on-time as a function of the ratio of delivery and leakage parameters. This ratio depends strongly on environmental factors. When $P_L$ is larger than $P_d$, percent on-time must be between 50% and 100% to control the temperature. Both on-time and off-time must be adjusted to maintain the desired percent on-time during a predetermined peak-load measuring interval. If the utility, by using the above equations and system parameters, determines that making the initially desired peak-load reduction will result in too large a deadband, it can adjust that peak-load reduction (decrease its absolute value) to maintain any desired deadband; by the same token, it can adjust a peak-load reduction (increase its absolute value) where additional deadband can be tolerated.

A formula describing the amount to increase $t'_{off}$ to regulate the on-time ratio of a system in a predetermined manner is now developed. The ratio of the desired on-time ratio to the initial on-time ratio, which is also the ratio of the desired KWH (or BTU or other appropriate unit) consumption to the initial KWH (or BTU, etc.) consumption, is R, where $0 < R < 1$. (In the preceding example, R was 4.5/6.67.)

In the following equations, as before, subscripts 1 refer to the old (i.e., unregulated) on and off times, while subscripts 2 refer to the modified (i.e., regulated) on and off times; primes indicate cumulative on and off time totals over a peak-load measuring interval (e.g., 30 minutes). Where the time values with subscripts 1 and 2 are equal, because that factor is being maintained constant, no subscript is used.

$$R = \frac{t'_{on}/(t'_{on} + t'_{off2})}{t'_{on}/(t'_{on} + t'_{off1})} = \frac{t'_{on} + t'_{off1}}{t'_{on} + t'_{off2}} \quad \text{(Eq. 8)}$$

Further rearrangement of terms leads to an equation for $t'_{off2}$ as a function of R, $t'_{on}$, and $t'_{off1}$ as follows:

$$t'_{off2} = \frac{(1-R)t'_{on} + t'_{off1}}{R} \quad \text{(Eq. 9)}$$

A similar equation can be developed to decrease $t'_{on}$ while keeping $t'_{off}$ constant:

$$t'_{on2} = \frac{R \, t'_{off}}{1 - R + \frac{t'_{off}}{t'_{on1}}} \quad \text{(Eq. 10)}$$

If it is desired to use the approach in which a predetermined $t''_{total}$ is set for the sum of the new values of $t'_{on}$ and $t'_{off}$, so that $t'_{on2} + t'_{off2} = t''_{total}$, the following equation expresses the relationship of the new cumulative on-time $t'_{on2}$ to the other parameters:

$$t'_{on2} = R \frac{t'_{on1} \, t''_{total}}{t'_{on1} + t'_{off1}} \quad \text{(Eq. 11)}$$

Here, if $t''_{total} = t'_{total} = t'_{on1} + t'_{off1}$, such as when a fixed 30-minute load-measuring interval is maintained, then $t'_{on2}$ is simply equal to $R \cdot t'_{on1}$.

If the utility decides to use the invention to implement a uniform peak-load reduction for all sites, it will not need to use the above equations, system parameters, and techniques. The utility would then just specify cumulative on-time, etc. parameters. For example, the utility might specify a cumulative maximum of 13 minutes on and a cumulative minimum of 17 minutes off for all sites (or a given group of sites) during a 30-minute period, if that is the utility-desired maximum load for the sites.

Deadband considerations

For prescribing the on-time ratio, the preceding equations may be related to the deadband equations stated earlier, i.e., $t_{on} \, P_d = t_{off} \, P_L = D$. For example, consider use of a Reddi Kilowatt load-reduction system in which the HVAC runs continuously for 13 minutes on and then continuously 17 minutes off. The deadband D under these conditions will be 13 $P_d$ or 17 $P_L$. If the HVAC is in heating mode and 17 $P_L > 13$ $P_d$, the temperature of the heated space will drift downwards. If the HVAC is in cooling (air conditioning) mode and 17 $P_L > 13$ $P_d$, the temperature of the cooled space will drift upwards. In any case, a deadband D may be determined. The value of D might be 5° F. or more; in that event, customers would probably sense discomfort, even if the temperature did not drift away from set point. Accordingly, customers would probably not consider regulation with this deadband as acceptable, and the on-time ratio would probably need to be increased. In one mode of practicing the invention, therefore, $t'_{on}$ would be determined in the first instance with one of the equations discussed above. Then, a determination would be made of the value of D that use of that value of $t'_{on}$ caused. If D exceeded a predetermined value D', such as 3° F., $t'_{on}$ would be increased until D no longer exceeded D'.

On the other hand, the value of D might be 2° F. or less; in that event, customers could absorb a slightly larger deadband without sensing discomfort. Therefore, if the temperature did not drift from set point, a greater load reduction could be imposed at the site without creating discomfort. Under this approach, the on-time ratio would be decreased until discomfort was created, doing so by using the same methodology described in the preceding paragraph.

The comfort/discomfort boundary may be defined in terms of an acceptable deadband D'. On the basis of empirical observations, the inventors consider 3° F. a maximum. While the inventors consider this an appropriate value for comfort/discomfort level, a utility may choose to adopt some other predetermined maximum value for D'. That would be a matter of design choice, but the methodology described herein for implementing that design choice would be the same, regardless of the particular value of D' selected.

Accordingly, if a utility so desires, it is possible to increase the load reduction at a given site, on the basis of site-specific thermal parameters.

It is also possible for a utility to adopt an intermediate strategy between site-specific determinations for each site and a purely arbitrary determination for all sites. A utility may choose to make a survey based on a representative sample of buildings and establish values of R on the basis of the results of the survey.

Other discomfort considerations

It is believed that combining the system of the present invention with that of the invention of the inventors' '146 patent can lead to greater reduction of discomfort of consumers than is achieved using the Reddi Kilowatt load reduction system now in use in Washington, D.C., and elsewhere. The load reduction system used by some utilities such as pepco in Washington, D.C., calls for a cycle of 17 minutes off and 13 minute on during peak load periods. Pepco accomplishes this by turning off power to those consumers accepting the system, by means of a radio-controlled power relay. Hence, a consumer's air conditioning system may run in accordance with a cycle of 13 consecutive minutes on and 17 consecutive minutes off during each half hour in which the load reduction is in effect. During the compulsory off period, the HVAC system will not maintain set point and consumer discomfort will result.

In contrast, combining the instant invention with that of the '146 patent would probably operate as follows. A fuel-on period is typically 2 to 5 minutes under peak load. It is followed by an off period of 2 to 2.5 minutes. A probable worst case situation is therefore a 7.5 minute cycle in which the unit is on for 5 minutes and off for 2.5 minutes. Over a 30 minute interval, there would be four such periods, with a total on time of 20 minutes and a total off time of 10 minutes. The consumer thus has four separated 2.5 minute off periods in a half hour, as compared with a single 17 minute off period under the Reddi Kilowatt system that Pepco uses. It is believed that the present invention thus provides for much less consumer discomfort, while achieving the same effect, as the presently used (prior art) load reduction system.

Control System Method and Apparatus

It is thus seen that a utility can limit its peak load to a predetermined amount by controlling the relationship between users' on-time and off-time in a predetermined manner. A method and apparatus are now described which accomplish this purpose more inexpensively than does the expedient of control of peak load by using radio-controlled relays to turn HVACs off. In addition, the present invention does not require interruption of 115 v or 230 v AC power lines or the services of a trained installer or licensed electrician. As will appear, the present invention can be carried out with a simple retrofit kit, since only low-voltage (e.g., 24 v) thermostat lines are affected. The invention can also be carried out by integrating the control unit of the invention into a new thermostat, during manufacture. The operation of the invention would be as described herein, irrespective of whether the invention is implemented physically as a separate module or subassembly, on the one hand, or as an integral part of the thermostat, on the other hand.

One advantageous implementation of the foregoing procedure is shown in FIG. 1, as follows: System 10 comprises a thermostat 12 (which can be a conventional bimetallic thermostat), a limit control unit 14, AND gates 16 and 18, and HVAC relays 20 and 22.

In unregulated operation, thermostat 12 sends FUEL=1 and DELY=1 signals via enabled AND gates 16 and 18 to HVAC relays 20 and 22, whenever the thermostat senses a temperature condition calling for a fuel-on state. Relay 20 controls the furnace/AC unit, and relay 22 controls the blower, of furnace/AC unit and blower or circulating pump (for boilers) 24. These relays conventionally actuate the HVAC system's furnace or air conditioner (as applicable), and the HVAC system's blower, or circulating pump in the case of using this invention with boilers, during a fuel-on state. (The conventional electrical connections between relays 20 and 22, and furnace/AC and blower or circulating pump unit 24, are not shown in FIG. 1.) Unit 24 may also be a heat pump, which for purposes of this specification should be considered equivalent to an air conditioner.

Hard-wired TTL chip implementation

Figure 2:
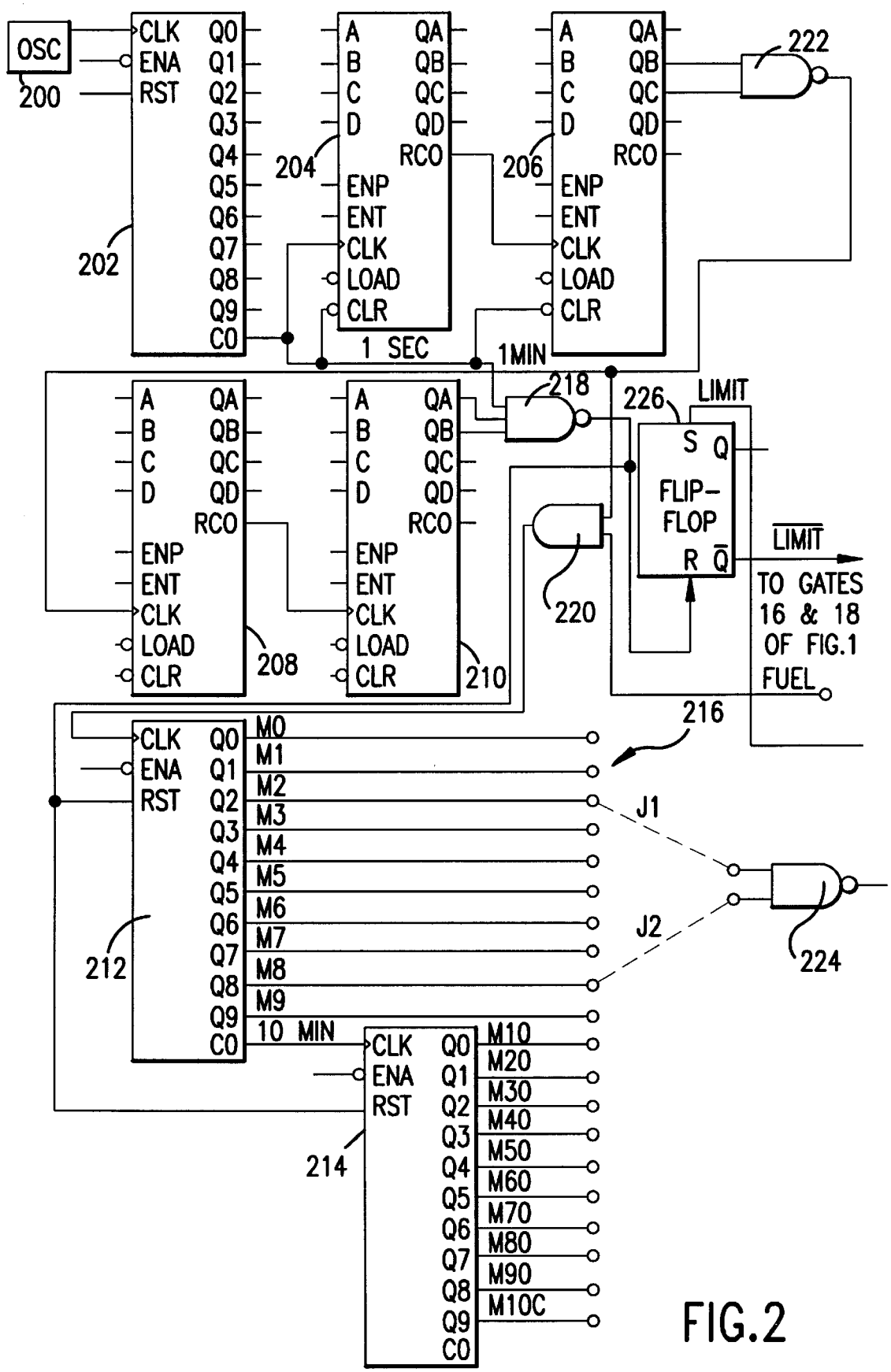
FIG. 2 is a discrete-logic schematic of portions of the control system of the invention.

FIG. 2 shows discrete logic for implementing limit control unit 14 of the invention with conventional, off-the-shelf TTL chips. A conventional off-the-shelf oscillator chip 200 provides a 10 Hz signal to a clock input of a conventional, off-the-shelf decade counter 202, thereby generating a timing pulse at output CO of counter 202 each second. The timing pulse clocks a first decade counter/decoder chip 204 (and also feeds a NAND gate 218, discussed below). Decade counter/decoder chip 204 produces a pulse at its RCO output every 10 sec. The latter pulse clocks a second decade counter/decoder chip 206, whose QB and QC outputs are fed to a NAND gate 222, thereby providing a signal at 1 min intervals.

This 1 min pulse resets the first and second counter/decoders 204 and 206, and clocks a third decade counter/decoder chip 208. (Also, the 1 min pulse primes an AND gate 220, discussed below.) Counter/decoder 208 provides a pulse every 10 min at its output RCO, clocking a fourth decade counter/decoder chip 210, whose QA and QB outputs are fed to NAND gate 218, providing a pulse every 30 min (the peak-load measuring interval). In addition, 1 sec timing pulses from decade counter 202 feed NAND gate 218. The output of NAND gate 218 resets third and fourth decade counter/decoder chips 208 and 210, a second decade counter 212, and a fifth decade counter/decoder chip 214; it also feeds a R-S flip-flop 226.

The peak-load monitoring intervals keep repeating, so that every 30 min the $\overline{Q}$ output of flip-flop 226 is a 1. This primes (enables) AND gates 16 and 18 of FIG. 1, permitting passage forward of FUEL=1 and DELY=1 signals from thermostat 12 of FIG. 1 to HVAC relays 20 and 22, actuating the HVAC system-if thermostat 12 is providing such 1 signals.

The 1 min pulses from NAND gate 222 also pass through AND gate 220 whenever FUEL=1, thereby permitting counter 212 to advance 1 min at a time as long as FUEL=1. Output CO of counter 212 clocks counter 214, so that it advances every 10 min. Outputs M0, M1, M2 . . . M9 of counter 212 are connected to posts M0, M1, M2 . . . M9 of a terminal set 216; they represent 0, 1, 2 . . . 9 min intervals. Outputs M10, M20, M40, and M80 of counter 214 are connected to posts M10, M20, M40, and M80 of terminal set 216; they represent 10, 20, 40, and 80 min intervals. Jumpers J1 and J2 are used to connect selected posts of terminal set 216, which can be selected for a predetermined limit on-time from 1 min to approximately 100 min, to the inputs of a NAND gate 224. When the predetermined limit on-time is reached, NAND gate 224 is enabled.

Therefore, at the predetermined limit on-time, NAND gate 224 will operate to set flip-flop 226. That in turn un-primes AND gates 16 and 18 of FIG. 1, via the $\overline{Q}$ output of flip-flop 226, opening the HVAC system relays, thereby prohibiting any continued operation of the furnace or blower until the next time flip-flop 226 is reset, which occurs at the end of the peak-load measuring interval. Hence, if during any peak-load measuring interval FUEL=1 for the predetermined limit on-time, NAND gate 224 will turn off the HVAC relays and replace the FUEL=1 signal by a FUEL=0 signal at the furnace/air conditioner.

Microcontroller implementation

Figures 3, 4:
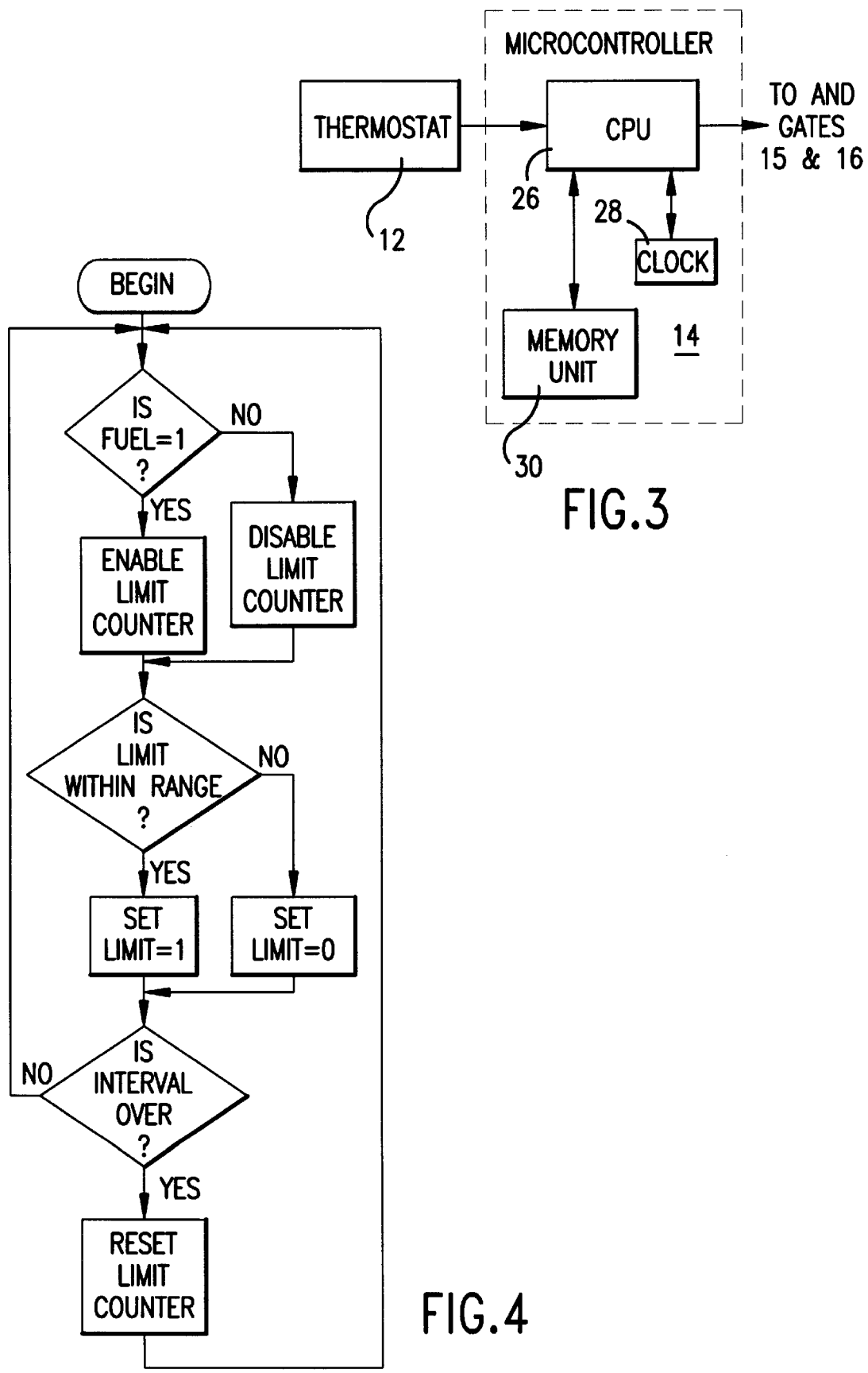
FIG. 3 is an alternative representation of portions of the control system of the invention, implemented with a programmed microprocessor or microcontroller, rather than discrete logic.
FIG. 4. is a flowchart of a programmed microcontroller implementation of the system.

Limit control unit 14 may advantageously be implemented as a conventional, off-the-shelf microcontroller, shown in FIG. 3, having a CPU 26, a clock 28, and a programmable memory 30 on the same IC chip. (An alternative implementation is a programmed microprocessor with separate clock and memory. A gate array can provide still a further implementation by means known to persons of ordinary skill in electrical engineering.) Limit control unit 14 always sends a 1 signal to AND gates 16 and 18 during periods of unregulated operation. (AND gates 16 and 18 can be implemented also as relays.) The 1 signal enables the AND gates, so that they pass any FUEL =1 (or DELY=1) signal on to the relays. Hence, during unregulated mode, thermostat 12 controls the HVAC system as if limit control unit 14 did not exist.

CPU 26 periodically acts as a comparator and compares the cumulative time elapsed during fuel-on states (i.e., when AND gate 16 sent a FUEL=1 signal to relay 20) during the current peak-load measuring interval with a reference signal (corresponding to the J1-J2 jumper setting for terminal 216, described above) stored in memory unit 30 for a predetermined maximum cumulative on-time during any peak-load measuring interval, $t''_{on}$. If and when cumulative actual on-time $t'_{on} > t''_{on}$, CPU 26 sends a 0 signal to AND gate 16 and thus inhibits or disables the AND gate, so that it no longer passes the FUEL=1 signal to relay 20. That turns off the furnace, heat pump, or air conditioner.

CPU 26 compares the time elapsed since the beginning of the peak-load measuring interval with the value of the peak-load measuring interval (t'hd total, typically 30 minutes) stored in memory unit 30. When time elapsed equals $t'_{total}$, the elapsed time and $t'_{on}$ clocks are reset to zero. Then CPU 26 once again sends to AND gates 16 and 18 a 1 signal, which remains in effect until $t'_{on}$ again exceeds the predetermined limit, $t''_{on}$.

During the regulated mode, AND gate 18 is controlled identically to AND gate 16 if the HVAC system has no secondary-delivery interval.

In FIG. 4, a flowchart is shown that sets forth the operation of a programmed microcontroller functioning as described in the preceding paragraphs.

Determination of Jumper Settings/Reference Signal

The hard-wired and programmed-microprocessor implementations described above utilized jumper settings (J1, J2) or stored reference signals, respectively, to impose a limited on-time. These settings/signals are intended to be provided by the utility, which would supply the thermostat system to customers in order to control their peak-load usage of fuel. The utility would determine the values of these settings/signals in accordance with its own criteria, together with the formulas described above. Such criteria could be based on general system-capacity considerations with, or without, reference to site-specific thermal parameters, as a matter of utility choice. Thus, a utility might simply decide to limit all HVACs to an on-time that is a selected fraction of the measuring interval. Alternatively, the utility could select settings/signals allowing a predetermined maximum load and associated achievable heating and air conditioning temperatures at a site, and work from that to the on-time ratio and settings/signals. The extent to which a utility decides to limit a given customer's fuel usage is a matter of utility discretion, and as such is not part of this invention. Once the utility has exercised that discretion, the utility's choice can be implemented by using the apparatus and techniques described in this specification.

Additional Refinements of Control System
Retrofits and Original Installations

The foregoing system can be used as a retrofit unit with preexisting conventional thermostats. Referring to FIG. 1, it can readily be seen that if the fuel and delivery wires of thermostat 12 are interrupted (cut) at lines AA and BB, the control system of the invention can be inserted into a preexisting conventional thermostat system without need for substantial modification. These wires ordinarily carry a 24 v AC signal, so that interrupting them (for example, at the terminals of the existing thermostat) for retrofit purposes does not pose a significant safety hazard and is within the capability of a competent handyman or homeowner. The invention can also be incorporated into a new thermostat installation, either as a separate module or integrated with the thermostat. In the latter case, of course, it is not necessary to cut any building wires or disconnect an existing thermostat to provide interruption of the lines from the thermostat to the HVAC relays.

Disablement of Regulation

During peak load operation, the regulation of the on-time ratio may cause the HVAC system to deviate from set point. Thus, in summer (i.e., air conditioning season) the temperature at the thermostat may rise above set point during peak load period, and in winter (i.e., heating season) the temperature may fall below set point. It may therefore be desirable to include one or both of two additional refinements.

First, a "no regulation/on-off" switch may be inserted to disable the effect of limit control unit 14, if the user finds the discomfort excessive. Referring to FIG. 1, such a switch can advantageously be inserted in the LIMIT output line coming from limit control unit 14. However, customers' use of such a switch would be inconsistent with the utility's allowing a discount to the customers for using a thermostat embodying the invention. It is believed that a utility would exclude buildings so equipped from its calculated load reduction. One approach might be to record use of the "no regulation/on-off" switch, or cause a signal to be sent, so that the utility could deprive the customer of the benefit of the discount which the utility allowed for installation of the limit system. The inventors consider it preferable, however, for the utility to supply the customer with a thermostat that does not accommodate the disabling switch. If the customer later has a change of mind, the customer would call the utility to install a different thermostat, and change the applicable fuel rate at the same time.

Second, a safety disablement means may be included, to prevent freezing of pipes or adverse comfort and health effects due to excessive lowering of temperature in winter or excessive raising of temperature in summer. Thus, a "safety" bimetallic thermostat set at, for example, 40° F., could be inserted between lines AA and BB of FIG. 1. Then, if temperature fell below the safety set point (here, 40° F.) the safety bimetallic thermostat would close a circuit and provide a parallel path around limit control unit 14 for a FUEL=1 signal to actuate a furnace or heat pump. A similar high-temperature safety disabler can be used, if that is considered desirable, for an air conditioner. Thus, a "safety" bimetallic thermostat set at, for example, 100° F., could be inserted between lines AA and BB of FIG. 1. Then, if temperature rose above the safety set point (here, 100° F.) the safety bimetallic thermostat would close a circuit and provide a parallel path around limit control unit 14 for a FUEL=1 signal to actuate an air conditioner. This technique should not be used if it leads to a $P_L/P_{LD}'$ ratio below 1, unless the utility decides that it will no longer maintain the prior set point under these conditions.

Partial Disablement-Reduced Regulation

An alternative strategy can be adopted, using either the gate logic implementation of FIG. 1 or the programmed microcontroller implementation of FIGS. 3–4. This method is a variation on, and consistent with, the foregoing procedure. Wholly disabling the on-time limitation scheme of the invention when the regulated HVAC fails to maintain temperature above (or below) a particular level would permit the HVAC system to operate without any regulation at all. It would be possible, instead, to have the system operate on the basis of a different on-time ratio, higher than that of the primary regulation scheme but lower than that of a fully unregulated system. This on-time ratio could be, for example, that resulting from use of the ASHRAE design methodology for worst-case day conditions in a normal year, instead of for a peak-design year (e.g., worst day anticipated over 30 years). This ratio could instead be selected to improve the utility's load curve on days when the total load is below the maximum peak.

That leads to the following equation for on-time ratio:

$$R_{OT-worstcase} = \frac{1}{1 + \frac{P_d}{P'_{LD}}} \quad \text{(Eq. 12)}$$

where $P_{LD}'$ is $P_{LD}$ determined for the worst anticipated day in a normal year, rather than the worst anticipated day over some longer measuring period such as 30 years. It will be appreciated that the invention is not limited to any particular time span or methodology such as that of ASHRAE.

Moreover, the invention can use both a lower on-time ratio for the worst case in 30 years, or worst case in an average day on a day when system load is not at an annual sendout maximum (in order to improve the load curve or reduce the customers' demand charges. Other load limits may be selected as well, as a matter of design choice.

When the HVAC system is operated with this on-time ratio, the system limits peak-load consumption of fuel to the maximum extent consistent with worst-case design conditions, for example, as determined by applying the ASHRAE methodology to the site-specific thermal parameters of the building at the site.

One expedient for triggering the alternative limit for the limit control is advantageously a pair of bimetallic thermostats (auxiliary to the main thermostat 12 of FIG. 1), one set for the excessive-heat limit (for example, 95° F. during cooling season) and the other set for the excessive-cold limit (for example, 40° F. during heating season). Referring to FIG. 1, two-input AND gates 16 and 18 are each replaced by three-input AND gates. A conventional pull-up resistor connected to a positive voltage is used to feed one side of each bimetallic auxiliary thermostat, and that side is connected to the input port of the three-input AND gate, so that a 1 signal is provided to the AND gate's input port when the auxiliary bimetallic thermostat is open circuit. The other side of the auxiliary bimetallic thermostat is connected to a pull-down resistor connected to a negative voltage, so that a 0 signal is provided to the AND gate's input port when the bimetallic auxiliary thermostat is closed circuit. Hence, a 1 is provided when room temperature T is such that 40° F.<T<95° F.; but a 0 is provided when room temperature T is such that 40° F.>T or T>95° F. When a 0 is provided to the AND gates, this effectively deactuates the normal limit control 14. An inverse circuit then simultaneously actuates a substitute limit control storing the alternative limit signals, allowing a predetermined, greater than normal on-time to be placed into effect. This is the secondary limit. The same expedient can be further extended to provide one or more additional substitute limits designed to avoid temperatures which impose health hazards or produce excessive discomfort.

The same effect can be realized by an additional program routine, placed into effect when the thermostat 12 of FIG. 1 indicates that 40° F.>T or T>95° F. This condition brings into effect a new limit as range for the flowchart of FIG. 4. It will be appreciated that the values 40° F.>T and T>95° F. are just intended to be illustrative and they could be any predetermined values deemed appropriate.

The inventors consider this expedient for alternative limits on on-time to be important because utilities have a great desire and need to control the set-point temperature in buildings that their gas or electricity serve. Users may tend to increase their set point in heating mode (and decrease their set point in cooling mode), when their on time is limited, for example, during systemwide peak load periods; that could defeat the utilities' peak load reduction programs if the utilities were unable to counteract such conduct.

The present invention allows a utility, in effect, to perform a room temperature check with the bimetallic thermostats or digital comparators just described. If this temperature check shows that utility-predetermined upper or lower limits are exceeded, the program or circuitry of the invention allows an increase in on time to a utility-predetermined secondary limit. In effect that allows an adjustment of room temperature in the direction of increased user comfort. But if the temperature check shows that utility-predetermined upper or lower limits are not exceeded, the program or circuitry of the invention does not allow an increase in on time to the utility-predetermined secondary limit, and thus does not allow an adjustment of room temperature in the direction of increased user comfort, which would interfere with the utility's peak load reduction program.

Regulation of Non-HVAC Equipment

The control unit of the invention generates a signal to curtail HVAC fuel consumption, when the peak-load limit that the utility has predetermined as an on-time ratio is reached. This signal may be used to operate other relays besides the HVAC system relays, or to operate other control devices. Hence, it is possible to curtail fuel consumption by other machines or devices (for example, a hot-water heater, oven, or clothes dryer), when peakload consumption is reached. This can be done even though the other machines or devices are not directly controlled by the HVAC system's thermostat. This can be done, also, without using the signal to curtail use of fuel by the HVAC system.

This expedient is conveniently implemented by conventional, well known techniques using wired or wireless communication to actuate relays (or other controllers) controlling power delivery to the other machines or devices. Referring to FIG. 1, the LIMIT output of limit control unit 14 may advantageously be connected to drive a relay or other control device for controlling delivery of power to the other machines or devices whose power (or fuel) use is to be curtailed when peak loads are being experienced.

For example, a hotel might wish to curtail its use of clothes dryers and ironing equipment in its laundry or use of ovens in its bakery during a period of weather-induced, catastrophic (force majeure), or other systemwide peak-load fuel consumption, in order to avoid being assessed with heavy annual demand charges that are based on, or increased by, single peak maximum usage. Whether or not the hotel's HVAC fuel usage was curtailed, the hotel could implement a reduction of non-critical fuel usage in its laundry and/or bakery operations by means of the expedients described in the preceding paragraph. The fuel-supplying utility would therefore not levy demand charges on the hotel because of the possibly excessive contributions to peak load that this expedient would allow the hotel to avoid.

Measurement System

It is important to utilities to be able to measure and determine what peak loads will be under varying weather conditions and under varying conditions of use of energy conservation expedients. It may also be important to be able to demonstrate the results of such measurements and determinations, to support a choice of one approach or another.

The basic operating principle of one presently preferred proposed commercial implementation of the interface device, the previously mentioned LP APPLIQUE, is to record in an SRAM chip, EEPROM chip, battery-backed up RAM chip, or other convenient data recording mechanism the times at which a thermostat sends an on signal or off signal to the furnace or other fuel consuming device. That is one simple form of interface device. In a more elaborate form, the interface device also includes a temperature sensor, so that measurements of T can be recorded, and from them values of dT/dt can be determined, which in turn permits determination of $P_d$ and $P_L$. (See Eqs. 1–3, above.)

As indicated above at the end of the Parameters section of the specification, during an interval $t'_{total}$, e.g., 30 minutes, fuel consumption is the product of $F_d$ and $t'_{on}$. This product may be termed F'. (Rather than a simple product, for a complex HVAC system with varying fuel consumption F' will be $\int F_d dt$ over the period in question. Persons of ordinary skill in electronic engineering arts will appreciate how to adapt the system to an implementation using an integrator and look-up table storing appropriate time-variable values of fuel consumption.)

In this implementation, the measuring system of the interface device contains a clock, time recording means (memory), and fuel-on/fuel-off signal sensing means. Every time the thermostat sends the furnace or other fuel consuming device a signal for a change of state from fuel on to fuel off, or vice versa, the clock is read and a recording of the time is made in the recording means (memory). (On and off time can each be recorded in memory, or on time and duration of such on time can instead be recorded. These expedients are basically equivalent, but the latter may use up less memory.) Hence, a record is provided of the times during which fuel was consumed. From this data, using the relationship $F'=F_d t'_{on}$, or any other appropriate form of fuel consumption equation (such as $\int F_d dt$ over the period in question), the utility can determine how much fuel was consumed during any relevant times, such as peak load intervals; if use of memory is no obstacle, non-peak load periods can be monitored as well as peak-load periods. In addition, the utility can compare fuel consumption actually occurring during a given interval during which no load regulation expedient was in effect with another interval during which a load regulation expedient was in effect.

A preferred form of this implementation of the interface device includes a temperature sensor. Since utilities already keep records of outdoor temperature, the recorded data will permit determination for any given house of its $P_L$ heat flux leakage factor as a function of the difference between outdoor temperature and (indoor) set-point temperature, as well as determination of $P_d$, which is relatively insensitive to outdoor temperature. If desired, a utility can record outside temperature in the vicinity of each house or group of similarly sited houses. This permits use of a method for making a comparison of the operation of a heating system of a given house under the control of two different thermostats at two different times, even though the external temperatures are not the same. (To be sure, the accuracy of the comparison may be affected if the home owner throws open the windows and front door on one day when one control system is in effect and leaves them closed on another day when another control system is in effect. But such effects, to the extent that they occur, will average out.)

Figure 6:
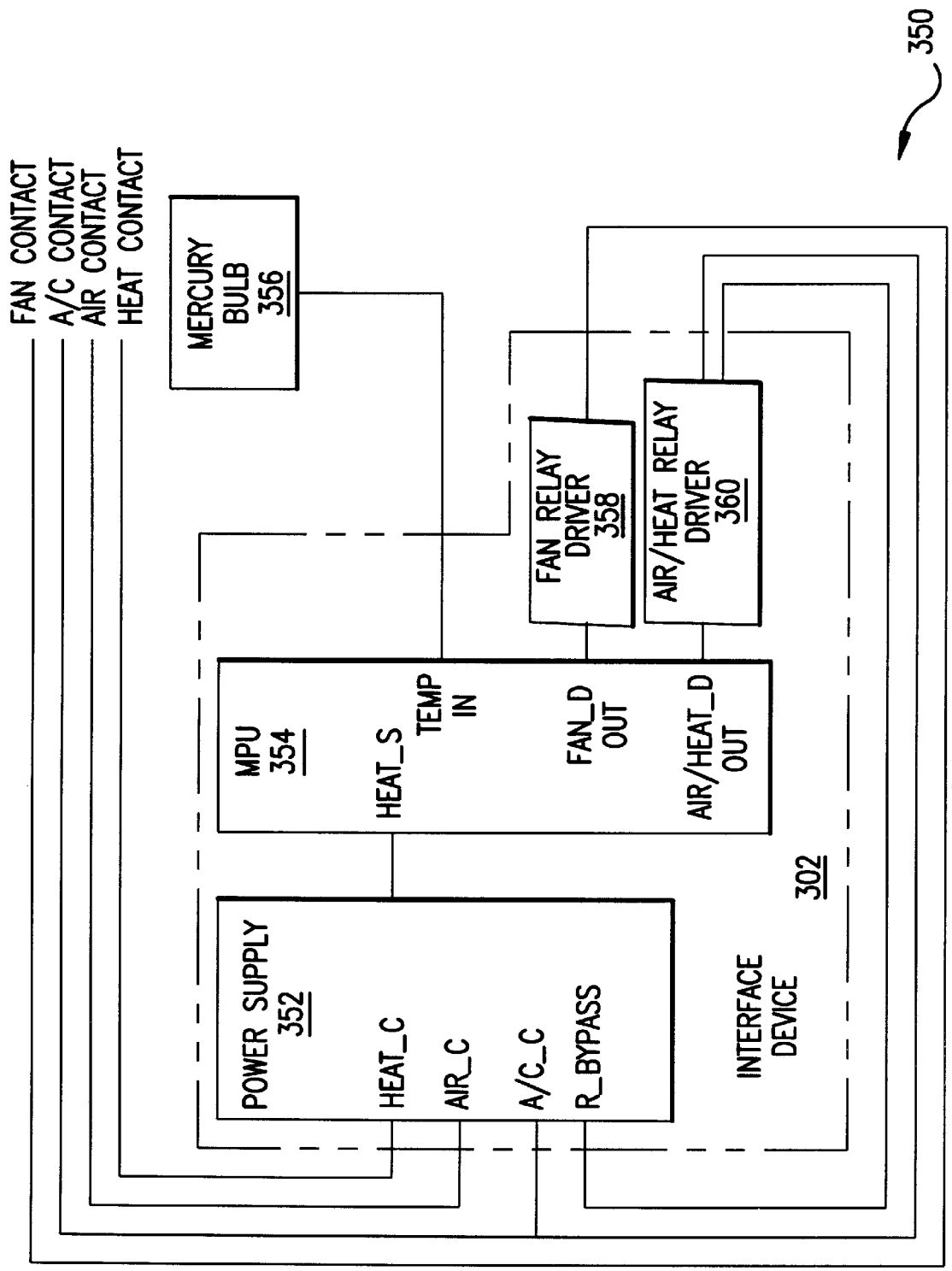
FIG. 6 is a block diagram of the interface device (applique) of the invention.
Figure 7:
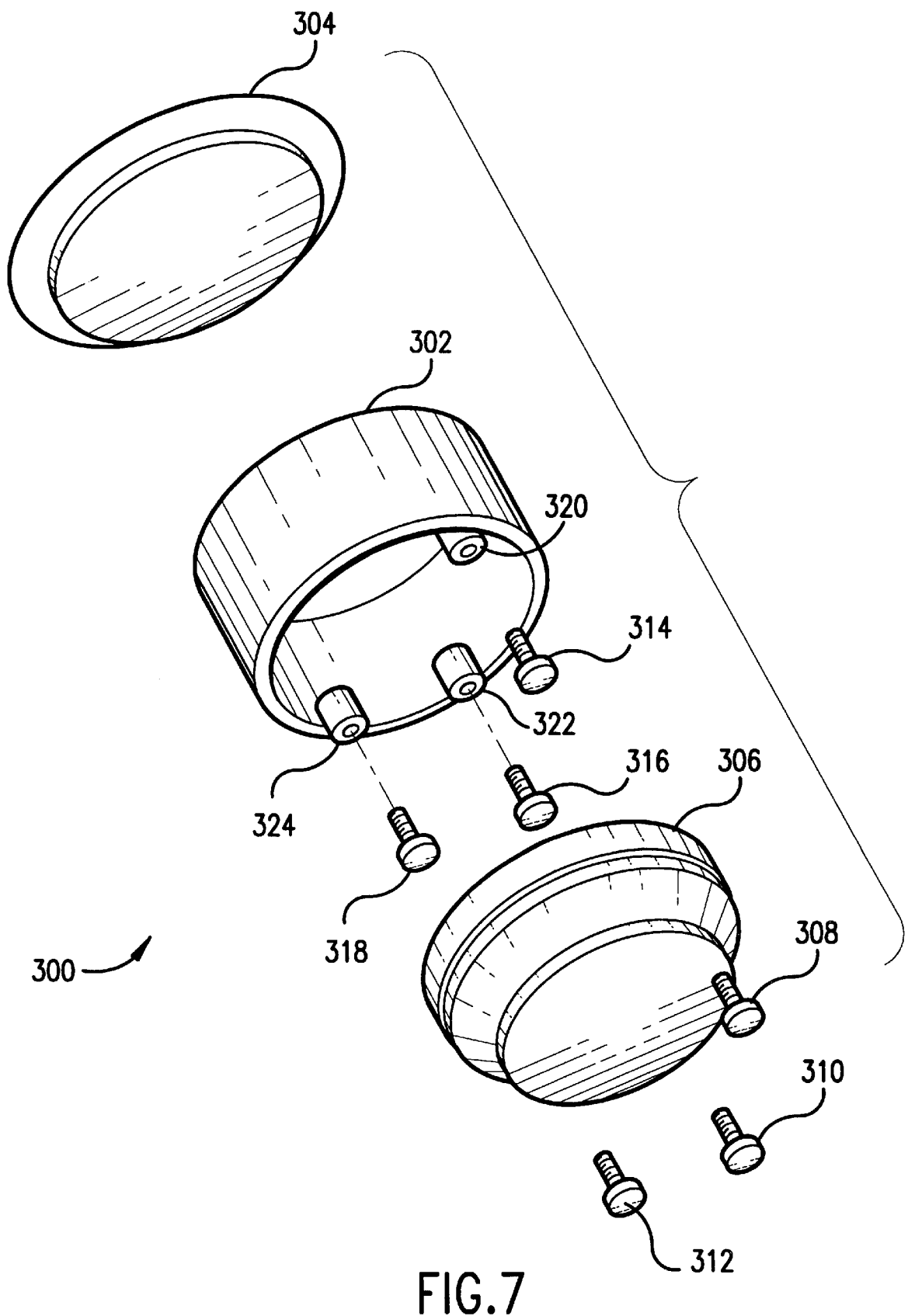
FIG. 7 is an exploded perspective drawing showing an implementation of the interface device (applique) of the invention, located intermediate between the base plate and cover unit of an existing thermostat.

Another presently preferred commercial implementation of the interface device, the previously mentioned LP APPLIQUE, is shown in block diagram FIG. 6 and exploded perspective drawing FIG. 7. As shown in FIG. 7, the interface device (applique) of this invention is intended to be located intermediate of the base plate and cover unit of an existing wall-mounted thermostat, to facilitate retrofit operations. A complete thermostat system 300, comprises an interface device 302 located above a base plate 304 of an already installed round thermostat unit and under a cover unit 306 of that thermostat. Prior to retrofit, unit 306 is fastened to base plate 304 with three screws 308, 310, and 312. (This unit is designed to provide an interface for a widely used round thermostat that has an installed base in United States homes of many millions of units, using a standardized electrical connection configuration for the fan, furnace, etc. of an HVAC system.)

To perform a retrofit in which the interface device is placed between the base plate and cover unit, the three screws 308, 310, and 312 are removed and temporarily set aside, as is the cover unit. Interface device 302 is then fastened to base plate 304. Three additional screws 314, 316, and 318 are screwed through holes in interface device 302 located in the same orientation as the holes of base plate 304 through which screws 308, 310, and 312 formerly passed. This fastens interface device 302 to base plate 304, which can be done in only one orientation because the screws are arranged non-symmetrically. At the same time, fastening device 302 to base plate 304 causes necessary electrical connections to mate between interface device 302 and base plate 304. (plate 304 is never removed from the wall nor from its original electrical connections to the HVAC system. No wires are cut. This will permit fan, furnace, etc. signals to pass to the HVAC system relays exactly as they did before the retrofit, subject to the electronic control system of the invention. Moreover, the electrical connections for fan, furnace, etc. are necessarily made correctly, since they are preserved exactly as they were in the preexisting installation. It is thus impossible for a homeowner-retrofitter to transpose any fan, furnace, etc. electrical connections to the thermostat—even if they were originally installed with incorrectly color-coded wires. Any HVAC system that worked with the thermostat before the retrofit will continue to do so in the same way, subject to the control of the invention.)

Interface device 302 has connected to it three spacers 320, 322, and 324. The spacers are located in the same relative orientation as the holes of the base plate, and are threaded to receive three screws for fastening cover plate 306 to interface device 302. Thus, the retrofit operation is completed by passing the three original screws 308, 310, and 312 through their original holes in cover unit 306 and into the threaded holes of spacers 320, 322, and 324. This fastens cover unit 306 back into place in substantially its original spatial orientation.

Block diagram 6 shows the elements of an implementation of the interface device. The circuitry 350 of the interface device 302, described in the preceding paragraphs, contains four principal modules: a power supply 352, an MPU 354 (for example, a p87C750 chip), a fan relay driver 358, and an air/heat relay driver 360. MPU 354 is supplied a temperature signal by mercury bulb 356, which is a component of the preexisting thermostat being retro-fitted with the device of the invention. When ambient temperature falls below set point, the mercury bulb sends an "on" signal to the MPU. The MPU generates various outputs in accordance with the invention, as previously described. These outputs go to fan relay driver 358 to actuate the relay of the fan or blower of the HVAC system, and to air/heat relay driver 360 to actuate the relay for the furnace or air conditioner of the HVAC system. The drivers may advantageously be implemented by using a Darlington transistor connection (for example, a pair of 2N3905's) to provide power amplification of the MPU output; connecting an opto-isolator (for example, an MCP 3020)in series with the emitter of the Darlington; and using the opto-isolator output to drive a triac which acts as a switch for the relay coil.

CONCLUDING REMARKS

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, but rather comprehends the subject matter defined by the following claims.

For example, the invention has been described in terms of an HVAC system using a hot-air furnace and blower. The invention applies equally, however, to a heating system comprising a hot-water boiler and (optionally) a circulation pump. Hence, the term "HVAC system," as used in the claims, should be understood to comprehend such hot-water systems as well as the hot-air systems expressly described above.

The present invention can be practiced with an on-off or setback thermostat of the conventional bimetallic or electronic type, among others, provided that the operation of the two systems is not inconsistent.

A refinement of the present invention employs the peak-load fuel-consumption limitation device to control delivery of fuel to a hot water heater, oven, dryer, or other fuel-consuming device, so that they are denied fuel when the invention calls for denial of fuel to the HVAC system. The inventors contemplate use of this refinement, if at all, in conjunction with peak-load regulation of an HVAC system. However, it would be possible, also, to regulate the other fuel-consuming device(s) without simultaneously regulating an HVAC system, although the inventors do not at this time consider that a preferred mode of operation in home applications. The invention should therefore be understood to comprehend that variation.

Terminology

As used in the claims:

The term "hard-wired electronic device" refers to a PLA, gate array, TTL chip, combinatorial-logic semiconductor device, or other wired (rather than programmed) electronic device.

The term "[signal] originating at the site" of an HVAC system refers to a signal originally generated at the HVAC system's site, as contrasted with a signal generated at a remote site and transmitted to the HVAC system's site by radio or other telecommunication means.

The term "utility" refers to an electric or gas utility, whether privately owned or owned by a government, including any person, government, business organization, or other entity supplying fossil fuel or electric power to residential, commercial, or industrial customers. The term also includes any entity entitled to install equipment limiting peak-load consumption of fuel and/or peak-load demand.

The term "autonomous control device" refers to a control device such as that described hereinabove in this specification, which operates on the basis of signals generated on site. Such a device is to be contrasted with a device such as a remotely controlled power relay, by which a utility can curtail power consumption of an HVAC system by sending a radio or telephone signal to the device.

The term "inhibiting transmittal of said fuel-on signals for time intervals of sufficient length to limit said fuel-on states of said HVAC system's said cycles to said predetermined level" refers to a procedure by which the amount of on-time during a given interval ("on-time ratio," as described above) is limited, by inhibition of transmittal of fuel-on signals, to an amount that limits the HVAC system's fuel consumption to a level predetermined by the fuel-supplying utility to be consistent with the utility's peak-load reduction goals.

The term "maximum utility-desired sum of fuel-consuming intervals" means the maximum amount of time, cumulatively, that a utility desires to allow a fuel-consuming unit to consume fuel during an interval during which the utility measures fuel consumption (i.e., a load-measuring interval). The foregoing maximum amount of time is the sum of on-time intervals during the interval during which the utility measures fuel consumption, i.e., the cumulative on-time ($t'_{on}$) during such load-measuring interval ($t'_{total}$). It should be understood, however, as explained earlier in the specification, that there are not necessarily a plurality of intervals within a load-measuring interval. Under some operating conditions (for example, the spring or fall temperate weather example given earlier in the specification), a load-measuring interval can be surrounded by a single larger interval, such as a very long off-time interval beginning before and ending after the particular load-measuring interval begins and ends.

The term "predetermined maximum fuel-consumption load" refers to a fuel-consumption load at a given site, that a fuel-supplying utility predetermines is the maximum fuel consumption rate at the given site that is consistent with the utility's peak-load reduction goals.

The subject matter claimed is:

1. A system for limiting peak-load usage of fuel by a furnace, heat pump, or air conditioner, said system comprising:

a thermostat for providing fuel-on signals for initiating a fuel-consuming interval in which said furnace, heat pump, or air conditioner consumes fuel;

coupled to said thermostat, a timer for timing a length of an on-time interval during which said thermostat has sent a fuel-on signal to said furnace, heat pump, or air conditioner, and for providing an on-time signal representative of said length of said on-time interval;

coupled to said timer, an accumulator for accumulating said on-time signals and providing an actual cumulative on-time signal representative of an actual cumulative on-time that is a sum of said lengths of said intervals of on-time occurring during a given load-measuring interval;

a memory device for providing a reference signal representative of a predetermined cumulative on-time, said predetermined cumulative on-time being predetermined to be a maximum utility-desired sum of fuel-consuming intervals during which said furnace, heat pump, or air conditioner consumes fuel during said load-measuring interval;

coupled to said accumulator and to said memory device, a comparator for comparing said actual cumulative on-time signal with said reference signal representative of said predetermined cumulative on-time, and for providing an inhibit signal if said actual cumulative on-time exceeds said predetermined cumulative on-time; and coupled to said comparator and to said thermostat, an inhibitor device for inhibiting transmittal of said fuel-on signals from said thermostat to said furnace, heat pump, or air conditioner if said comparator provides an inhibit signal— whereby said furnace, heat pump, or air conditioner is prevented from consuming fuel when said actual cumulative on-time exceeds said predetermined cumulative on-time during said load-measuring interval.

2. A system in accordance with claim 1, in combination with a control for allowing or disallowing delivery of fuel to a hot water heater, oven, dryer, or other fuel-consuming device, wherein said comparator is coupled to said control so that if said comparator provides said inhibit signal delivery of fuel to said hot water heater, oven, dryer, or other fuel-consuming device is disallowed.

3. A method for limiting peak-load consumption of fuel by furnaces, heat pumps, or air conditioners located in a plurality of buildings, said method comprising locating systems in accordance with claim 1 in said plurality of buildings, and controlling said furnaces, heat pumps, or air conditioners with said systems.

4. The system of claim 1 combined with an interface device coupled to said system, said interface device comprising:

detector means for detecting transmittal of fuel-on and fuel-off signals from said system to said furnace, heat pump, or air conditioner;

coupled to said detector a timer for registering times when said fuel-on and fuel-off signals are transmitted from said system to said furnace, heat pump, or air conditioner; and coupled to said timer a memory for storing signals representative of said times when said fuel-on and fuel-off signals are transmitted from said system to said furnace, heat pump, or air conditioner.

5. The apparatus of claim 4 in which said interface device further comprises:

a temperature sensor for sensing ambient temperatures; and coupled to said temperature sensor, means for storing in said memory signals representative of ambient temperature at times when said fuel-on and fuel-off signals are transmitted from said system to said furnace, heat pump, or air conditioner.

6. The apparatus of claim 5 in which said interface device further comprises:

a further temperature sensor for sensing outdoor temperatures; and coupled to said further temperature sensor, means for storing in said memory signals representative of outdoor temperature at predetermined times.

7. A fuel-conservation subsystem of an HVAC system, said HVAC system including a thermostat for providing fuel-on signals for initiating a fuel-consuming interval in which a furnace, heat pump, or air conditioner consumes fuel, said fuel-conservation subsystem comprising:

a timer for timing a length of an on-time interval during which said thermostat has sent a fuel-on signal to said furnace, heat pump, or air conditioner, and for providing an on-time signal representative of said length of said on-time interval, said timer having coupling means for receiving said fuel-on signal from said thermostat;

coupled to said timer, an accumulator for accumulating said on-time signals and providing an actual cumulative on-time signal representative of an actual cumulative on-time that is a sum of said lengths of said on-time intervals occurring during a given load-measuring interval;

a memory device for providing a reference signal representative of a predetermined cumulative on-time, said predetermined cumulative on-time being predetermined to be a maximum utility-desired sum of fuel-consuming intervals during which said furnace, heat pump, or air conditioner consumes fuel during said load-measuring interval;

coupled to said accumulator and to said memory device, a comparator for comparing said actual cumulative on-time signal with said reference signal representative of said predetermined cumulative on-time, and for providing an inhibit signal if said actual cumulative on-time exceeds said predetermined cumulative on-time; and coupled to said comparator and to said thermostat, an inhibitor device for inhibiting transmittal of said fuel-on signals from said thermostat to said furnace, heat pump, or air conditioner if said comparator provides an inhibit signal.

8. A kit for retrofitting a thermostat for providing fuel-on signals for initiating a fuel-consuming interval in which a furnace, heat pump, or air conditioner consumes fuel, said kit comprising:

a timer for timing a length of an on-time interval during which said thermostat has sent a fuel-on signal to said furnace, heat pump, or air conditioner, and for providing an on-time signal representative of said length of said on-time interval, said timer having coupling means for receiving said fuel-on signal from said thermostat;

coupled to said timer, an accumulator for accumulating said on-time signals and providing an actual cumulative on-time signal representative of an actual cumulative on-time that is a sum of said lengths of said on-time intervals occurring during a given load-measuring interval;

a memory device for providing a reference signal representative of a predetermined cumulative on-time, said predetermined cumulative on-time being predetermined to be a maximum utility-desired sum of fuel-consuming intervals during which said furnace, heat pump, or air conditioner consumes fuel during said load-measuring interval;

coupled to said accumulator and to said memory device, a comparator for comparing said actual cumulative on-time signal with said reference signal representative of said predetermined cumulative on-time, and for providing an inhibit signal if said actual cumulative on-time exceeds said predetermined cumulative on-time; and coupled to said comparator and to said thermostat, an inhibitor device for inhibiting transmittal of said fuel-on signals from said thermostat to said furnace, heat pump, or air conditioner if said comparator provides an inhibit signal.

9. A kit in accordance with claim 8 wherein at least one of said timer, said accumulator, said memory device, and said comparator is implemented as a hard-wired electronic device.

10. A kit in accordance with claim 8 wherein said timer, said accumulator, said memory device, and said comparator are each implemented as at least one hard-wired electronic device.

11. A kit in accordance with claim 8 wherein said timer, said accumulator, said memory device, and said comparator are implemented with a programmed microprocessor or microcontroller integrated circuit chip.

12. A method for limiting peak-load consumption of fuel by a system comprising a furnace, heat pump, or air conditioner, and a thermostat for providing fuel-on signals for initiating a fuel-consuming interval in which said furnace, heat pump, or air conditioner consumes fuel, said method comprising:

(1) timing a length of an on-time interval during which said thermostat has sent a fuel-on signal to said furnace, heat pump, or air conditioner, and providing a on-time signal representative of said length of said on-time interval;

(2) accumulating said on-time signals and providing an actual cumulative on-time signal representative of an actual cumulative on-time that is a sum of said lengths of said on-time intervals occurring during a given load-measuring interval;

(3) providing a reference signal representative of a predetermined cumulative on-time, said predetermined cumulative on-time being predetermined to be a maximum utility-desired sum of fuel-consuming intervals during which said furnace, heat pump, or air conditioner consumes fuel during said load-measuring interval;

(4) comparing said actual cumulative on-time signal with said reference signal representative of said predetermined cumulative on-time, and providing an inhibit signal if said actual cumulative on-time exceeds said predetermined cumulative on-time; and (5) inhibiting transmittal of said fuel-on signals from said thermostat to said furnace, heat pump, or air conditioner if said inhibit signal is provided, whereby said furnace, heat pump, or air conditioner is prevented from consuming fuel when said actual cumulative on-time exceeds said predetermined cumulative on-time during said load-measuring interval.

13. The method of claim 12 further adapted for limiting peak-load consumption of fuel by a hot water heater, oven, dryer, or other fuel-consuming device, said method comprising the method of claim 12 wherein, if said inhibit signal is provided, delivery of fuel to said hot water heater, oven, dryer, or other fuel-consuming device is prevented.

14. A method for limiting peak-load consumption of fuel by a system located at a site, said system comprising a furnace, heat pump, or air conditioner, and a thermostat for transmitting fuel-on signals to said furnace, heat pump, or air conditioner for initiating a fuel-on interval of a fuel-on/fuel-off cycle of said system during which fuel-on interval said furnace, heat pump, or air conditioner consumes fuel, said method comprising:

(1) providing a reference signal representative of a predetermined maximum fuel-consumption load;

(2) providing a consumption signal representative of fuel consumption by said furnace, heat pump, or air conditioner;

(3) comparing said consumption signal with said reference signal; and (4) originating at the site of said system an autonomous inhibit signal for inhibiting transmittal of said fuel-on signals from said thermostat to said furnace, heat pump, or air conditioner for a sufficient portion of a load-measuring interval to lower fuel consumption by said furnace, heat pump, or air conditioner to a level in accordance with said reference signal representative of a predetermined maximum fuel-consumption load, said autonomous inhibit signal being generated at said site without any co-action with any signal originating off said site.

15. The method of claim 14 wherein said inhibit signal is fed to a controller for allowing or disallowing delivery of fuel to said furnace, heat pump, or air conditioner; and said controller disallows delivery of fuel to said furnace, heat pump, or air conditioner when said inhibit signal is fed to said controller.

16. The method of claim 14 wherein said site has a hot-water heater, oven, dryer, or other fuel-consuming device, and a controller for allowing or disallowing delivery of fuel to said hot-water heater, oven, dryer, or other fuel-consuming device; and said inhibit signal is fed to said controller, whereby delivery of fuel to said hot-water heater, oven, dryer, or other fuel-consuming device is prevented for a sufficient portion of a load-measuring interval to lower fuel consumption by said hot-water heater, oven, dryer, or other fuel-consuming device to a level in accordance with said reference signal representative of a predetermined maximum fuel-consumption load.

17. A method for limiting peak-load consumption of fuel in a plurality of buildings to a predetermined fuel-consumption level, each of said buildings having an HVAC system controlled by a thermostat located therein and connected to a fuel-consuming unit of said HVAC system by a line via which said thermostat transmits to said fuel-consuming unit fuel-on signals and fuel-off signals responsive to temperatures sensed by said thermostat, thereby causing said HVAC system to carry out cycles consisting of successive fuel-on and fuel-off states, said method comprising: interrupting said building's said lines; and inserting thereinto an autonomous control device for inhibiting transmittal of said fuel-on signals for time intervals of sufficient length to limit said fuel-on states of said HVAC system's said cycles to said predetermined fuel-consumption level, said autonomous control device operating without any co-action with any signal originating at a location remote from said building and said predetermined fuel-consumption level being defined in terms of a ratio of cumulative on-time to cumulative off-time over a given peak-load measuring interval.

18. The method of claim 17 wherein said ratio is predetermined by a utility that supplies fuel to said site.

19. The method of claim 18 wherein said utility predetermines said ratio for a group of sites on the basis of the utility's peak-load reduction goals and without reference to individual, site-specific factors.

20. The method of claim 18 wherein said utility predetermines said ratio for a site on the basis of site-specific values of heat-flux leakage and delivery parameters for said site's building and HVAC system and a predetermined set point for said thermostat.

21. The method of claim 18 wherein said utility predetermines said ratio for a group of sites on the basis of a survey made of a representative sample of sites and site-specific values of heat-flux leakage and delivery parameters for said sites' buildings and HVAC systems and a predetermined set point for said thermostat.

22. The method of claim 18 wherein said utility predetermines said ratio, hereinafter designated as $R_{OT}$, by means of the following equation:

$$R_{OT} = R \frac{1}{1 + \frac{P_d}{P_{LD}'}}$$

where R is a load-reduction factor selected by said utility, and 0<R<1; $P_d$ is heat flux between said site's HVAC system and building; and $P_{LD}'$ is heat flux between said site's building and an external environment thereof as determined on the basis of predicted worst weather conditions for a day during one normal year and a set point for said thermostat predetermined by said utility.

23. A method for limiting peak-load consumption of fuel in a plurality of buildings to a predetermined fuel-consumption level, each of said buildings having an HVAC system controlled by a thermostat, coupled to a fuel-consuming unit of said HVAC system, and transmitting to said fuel-consuming unit fuel-on signals and fuel-off signals responsive to temperatures sensed by said thermostat, thereby causing said HVAC system to carry out cycles consisting of successive fuel-on and fuel-off states, said method comprising:

(1) predetermining a fuel-consumption level in terms of a ratio of cumulative on-time to cumulative off-time over a given peak-load measuring interval and placing in said building an autonomous control device, coupled to or integrated with said thermostat, for inhibiting transmittal of said fuel-on signals for time intervals of sufficient length to limit said fuel-on states of said HVAC system's said cycles to said predetermined fuel-consumption level, said autonomous control device operating without any co-action with any signal originating at a location remote from said building; and (2) inhibiting transmittal of said fuel-on signals for time intervals of sufficient length to limit said fuel-on states of said HVAC system's said cycles to said predetermined fuel-consumption level.

24. The method of claim 23 wherein said predetermined fuel-consumption level is predetermined by a utility that supplies fuel to said site.

25. The method of claim 24 wherein said utility predetermines said ratio for a group of sites on the basis of the utility's available peak-load reduction goals and without reference to individual, site-specific factors.

26. The method of claim 24 wherein said utility predetermines said ratio for a site on the basis of site-specific values of heat-flux leakage and delivery parameters for said site's building and HVAC system.

27. The method of claim 24 wherein said utility predetermines said ratio for a group of sites on the basis of survey made of a representative sample of sites and site-specific values of heat-flux leakage and delivery parameters for said sites' buildings and HVAC systems.

28. The method of claim 24 wherein said utility predetermines said ratio, hereinafter designated as $R_{OT}$, by means of the following equation:

$$R_{OT} = R \frac{1}{1 + \frac{P_d}{P_{LD}'}}$$

where R is a load-reduction factor selected by said utility, and 0<R<1; $P_d$ is heat flux between said site's HVAC system and building; and $P_{LD}'$ is heat flux between said site's building and an external environment thereof determined on the basis of predicted worst weather conditions for a day during one normal year and a set point for said thermostat predetermined by said utility.

29. The method of claim 23 wherein said predetermined fuel-consumption level is defined in terms of a plurality of ratios of cumulative on-time to cumulative off-time over a peak-load measuring interval, where said plurality of ratios includes a primary ratio and a secondary ratio, and where a utility that supplies fuel to said site determines said primary ratio on the basis of anticipated worst weather conditions over a single year and determines said primary ratio on the basis of anticipated worst weather conditions over a plurality of years.

30. The method of claim 29 wherein said primary ratio remains in effect unless and until said temperature sensed by said thermostat, or a temperature sensed by an auxiliary thermostat, falls outside of predetermined temperature limits, whereupon said secondary ratio is placed into effect.

31. A site-specific method for limiting peak-load consumption of fuel by a system located at a site, under design peak-load conditions, said system comprising a furnace, heat pump, or air conditioner for heating or cooling a space, and a thermostat for providing fuel-on signals for initiating a fuel-consuming interval in which said furnace, heat pump, or air conditioner consumes fuel, said method comprising:

(1) providing a reference signal representative of a predetermined cumulative on-time $t'_{on}$, said predetermined cumulative on-time $t'_{on}$ being a utility-desired maximum sum of fuel-consuming intervals during which said furnace, heat pump, or air conditioner consumes fuel during a given load-measuring interval, $t'_{total}$, where $t'_{on}$ is determined with reference to site-specific thermal parameters relating to anticipated worst-day design conditions;

(2) timing a length of an on-time interval during which said thermostat has sent a fuel-on signal to said furnace, heat pump, or air conditioner, and providing a on-time signal representative of said length of said on-time interval;

(3) accumulating said on-time signals and providing an actual cumulative on-time signal representative of an actual cumulative on-time that is a sum of said lengths of said on-time intervals occurring during said load-measuring interval $t'_{total}$;

(4) comparing said actual cumulative on-time signal with said reference signal representative of said predetermined cumulative on-time, and providing an inhibit signal if said actual cumulative on-time exceeds said predetermined cumulative on-time; and (5) inhibiting transmittal of said fuel-on signals from said thermostat to said furnace, heat pump, or air conditioner if said inhibit signal is provided, whereby said furnace, heat pump, or air conditioner is prevented from consuming fuel when said actual cumulative on-time exceeds said predetermined cumulative on-time during said load-measuring interval.

32. The method of claim 31 wherein $t'_{on}$ is determined in accordance with the following equation:

$$t'_{on} = \frac{t'_{total}}{1 + \frac{P_d}{P_{LD}}}$$

where $P_d$ is heat flux in a unit time between said furnace, heat pump, or air conditioner and said space, and $P_{LD}$ is heat flux between said site's building and an external environment thereof determined on the basis of predicted worst weather conditions for a day during a predetermined period of years and a set point for said thermostat predetermined by said utility.

33. The method of claim 31 wherein $t'_{on}$ is determined in accordance with the following equation:

$$t'_{on} = \frac{t'_{total}}{1 + \frac{P_d}{P'_{LD}}}$$

where $P_d$ is heat flux in a unit time between said furnace, heat pump, or air conditioner and said space, and $P_{LD}'$ is heat flux between said site's building and an external environment thereof determined on the basis of predicted worst weather conditions for a day during one normal year and a set point for said thermostat predetermined by said utility.

34. The method of claim 31 comprising the further steps of determining said system's deadband D when said inhibit signal is provided; and, if said deadband D exceeds a predetermined amount D', increasing the value of $t'_{on}$ until said deadband D no longer exceeds D'.

35. The method of claim 31 comprising the further steps of determining said system's deadband D when said inhibit signal is provided; and, if said deadband D does not exceed a predetermined amount D', decreasing the value of $t'_{on}$ until said deadband D equals D'.

36. An interface device for collecting data representative of fuel usage in an HVAC system including a furnace, heat pump, or air conditioner and a room thermostat or other fuel usage control device, said interface device comprising:

means for coupling said interface device to a thermostat or other fuel usage control device of an HVAC system;

detector means for detecting transmittal of fuel-on and fuel-off signals from said thermostat or fuel usage control device to a furnace, heat pump, or air conditioner of said HVAC system;

coupled to said detector a timer for registering times when said fuel-on and fuel-off signals are transmitted from said thermostat or fuel usage control device to said furnace, heat pump, or air conditioner of said HVAC system; and coupled to said timer a memory for storing signals representative of said times when said fuel-on and fuel-off signals are transmitted to said furnace, heat pump, or air conditioner of said HVAC system.

37. An interface device according to claim 36 further comprising:

a temperature sensor for sensing ambient temperatures; and coupled to said temperature sensor, means for storing in said memory signals representative of ambient temperature at times when said fuel-on and fuel-off signals are transmitted to said furnace, heat pump, or air conditioner of said HVAC system.

38. An interface device according to claim 37 further comprising:

a further temperature sensor for sensing outdoor temperatures; and coupled to said further temperature sensor, means for storing in said memory signals representative of outdoor temperature at predetermined times.

39. A method of determining, autonomously at a site at which an HVAC system is located, fuel consumption by said HVAC system at selected times, said HVAC system having a thermostat or other fuel usage control device and said HVAC system including a furnace, heat pump, or air conditioner that consumes fuel, said method comprising:

(1) coupling to a thermostat or other fuel usage control device of an HVAC system an interface device having means for registering time and means for detecting transmittal of fuel-on and fuel-off signals to a furnace, heat pump, or air conditioner of the HVAC system;

(2) detecting and recording in a memory times when fuel-on signals are transmitted to a furnace, heat pump, or air conditioner of the HVAC system;

(3) detecting and recording in a memory times when fuel-off signals are transmitted to a furnace, heat pump, or air conditioner of the HVAC system; and (4) downloading from the memory at predetermined times the information recorded in steps (2) and (3).

40. A method according to claim 39 further comprising a step, before the down-loading step, of detecting and recording ambient temperatures at times when fuel-on and fuel-off signals are transmitted to a furnace, heat pump, or air conditioner of the HVAC system.

41. A method according to claim 40 further comprising a step, before the down-loading step, of detecting and recording outdoor temperatures at predetermined times.

42. An interface device for retrofitting an existing wall thermostat for an HVAC system to provide fuel-conserving functions for the HVAC system that the existing wall thermostat did not provide, the existing wall thermostat comprising:

a base plate having an inner side and an outer side, the inner side fastened to a wall, the base plate containing electrical connections to the HVAC system, for sending on and off signals to fan, furnace, or air-conditioner modules of the HVAC system; and a cover unit fastened to the outer side of the base plate, the cover unit having an initial spatial orientation to the base plate and wall, the cover unit containing a temperature sensor for sensing ambient temperatures, the temperature sensor having means for providing an on signal for the furnace module when ambient temperature falls below a predetermined value and means for providing an off signal for the furnace module when ambient temperature exceeds a predetermined value;

said interface device having an inner side and an outer side, and comprising:

means for connecting the cover unit to the outer side of said interface device;

means for connecting said interface device to the base plate in a manner such that said interface device abuts the outer side of the base plate and such that the cover unit substantially has said initial spatial orientation to the base plate and wall; and electronic circuitry comprising:

circuitry for receiving the on and off signals provided by the temperature sensor in the cover unit;

a microprocessor unit for processing the signals provided by the temperature sensor, in accordance with a predetermined fuel-conserving program and a signal representative of elapsed time, to provide further on and off signals whereby the HVAC system is prevented from consuming fuel when a predetermined cumulative on-time over a predetermined interval exceeds a predetermined value; and relay driver circuitry for receiving said further on and off signals and for providing via the electrical connections in the base plate amplified on and off signals to fan, furnace, or air-conditioner modules of the HVAC system, said amplified on and off signals being responsive to said further on and off signals.

* * * * *